Aug. 6, 1929.　　G. M. WILSON ET AL　　1,723,225
FISHING TOOL
Filed Jan. 12, 1927　　3 Sheets-Sheet 1

Inventor
George M. Wilson
Elmer E. Pryor.

Attorney.

Aug. 6, 1929.  G. M. WILSON ET AL  1,723,225
FISHING TOOL
Filed Jan. 12, 1927   3 Sheets-Sheet 2

Inventor
George M. Wilson
Elmer E. Pryor
Attorney.

Patented Aug. 6, 1929.

1,723,225

UNITED STATES PATENT OFFICE.

GEORGE M. WILSON, OF LOS ANGELES, AND ELMER E. PRYOR, OF FULLERTON, CALIFORNIA, ASSIGNORS TO HAROLD G. GILMAN, OF LOS ANGELES, CALIFORNIA.

FISHING TOOL.

Application filed January 12, 1927. Serial No. 160,553.

This invention has to do generally with tools used in recovering articles "lost" within deep-well bores. These articles range from sections of pipe and drilling tools to implements accidentally dropped by workmen from the derrick floor; and it is the general object of our invention to provide a fishing tool which may be employed successfully and expeditiously in grappling for such articles irrespective of their nature, within reasonable limits.

Our device may be typified generally as of the class wherein grappling elements are movable substantially radially with respect to the well bore, they being expanded radially in a manner to encompass the lost article, and, after encompassment, being adapted to be contracted radially and thereby engage the work with sufficient force to insure its withdrawal from the well when the tool is lifted subsequently.

Among the prime requisites of a succesful fishing tool of the above type is the capability of expansion to a considerable diameter, and then, after the tool is in register with the work of being contracted about and engaged forcibly with the work. These capacities our tool has in a surprising degree.

Another important feature of our invention lies in the provision whereby it may be "opened up" without withdrawal of the tool from the well in the event the "fish" is not caught when the tool is first contracted. In usual fishing tools of an expansible and contractible nature, should the fish fail to be caught when the tool is first contracted, the entire fishing string must be lifted from the well in order that the grappling jaws again may be set in expanded condition. When it is considered that the "round trip" necessary to accomplish this withdrawal, re-setting, and re-insertion of the fishing tool often requires a period of four or five hours, and then that the whole cycle of operation may have to be repeated, should the tool again fail to catch the fish, it will be seen that our provision for re-setting without withdrawal of the tool is a most important factor in reducing the costly time element of fishing operations.

We have also provided "tell-tale" means whereby the operator at the ground surface may be advised whether or not the tool has taken hold of the fish. The great advantage presented by this feature will be readily appreciated by those skilled in the art, and therefore need not be discussed here. It is a feature of special advantage when used in connection with a tool adapted to be re-set within the well, as with ours, but in no way is its advantage limited to tools having this particular characteristic. Therefore, our broader claims, drawn to this feature, are not to be considered as limited to such a specific application, except where this limitation is definitely set out in the claims.

We have also provided a slip joint connection in the tool whereby, after the tool strikes bottom, or is in position about the "fish," the tool may be relieved from the weight of the fishing string, so the tool parts are more freely movable during subsequent operation and generally raising the efficiency of and reducing the wear on the tool, as will be readily understood. In connection with this last named provision, there is employed a "tell-tale" device whereby notice is had the instant gravitation of the tool is checked. This feature is of special importance where the "fish" may be lying in soft bottom, when, if the string be lowered until it came to rest, after sinking through the bottom, the fish might be entered so far within the tool as to be improperly engaged thereby during subsequent operation, or parts of the tool might be broken due to the imposition of the weight of the entire fishing string thereon after the fish had been thus improperly entered.

Other objects and novel features of the invention will be made apparent from the following detailed specification, reference being had to the accompanying drawings wherein:

Fig. 1ª conventionally illustrates a well bore and our improved tool in connection therewith;

Fig. 8 is an enlarged section through a valve which may be used in connection with the device;

Fig. 11 is a detached view of one of the grapple arms;

Fig. 12 is an enlarged section on line 12—12 of Fig. 11, and showing the relative position of the other grapple arms when they are in full contracted position;

Fig. 13 is a section on line 13—13 of Fig. 11; and

Fig. 14 is a section on line 14—14 of Fig. 11.

Figure 1:
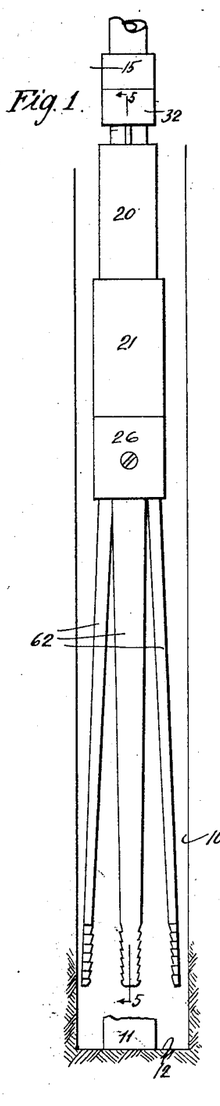
Fig. 1 is an enlarged elevation of an embodiment of our invention shown in expanded position and about to engage work.
Figures 1A, 8, 11, 12, 13, 14:
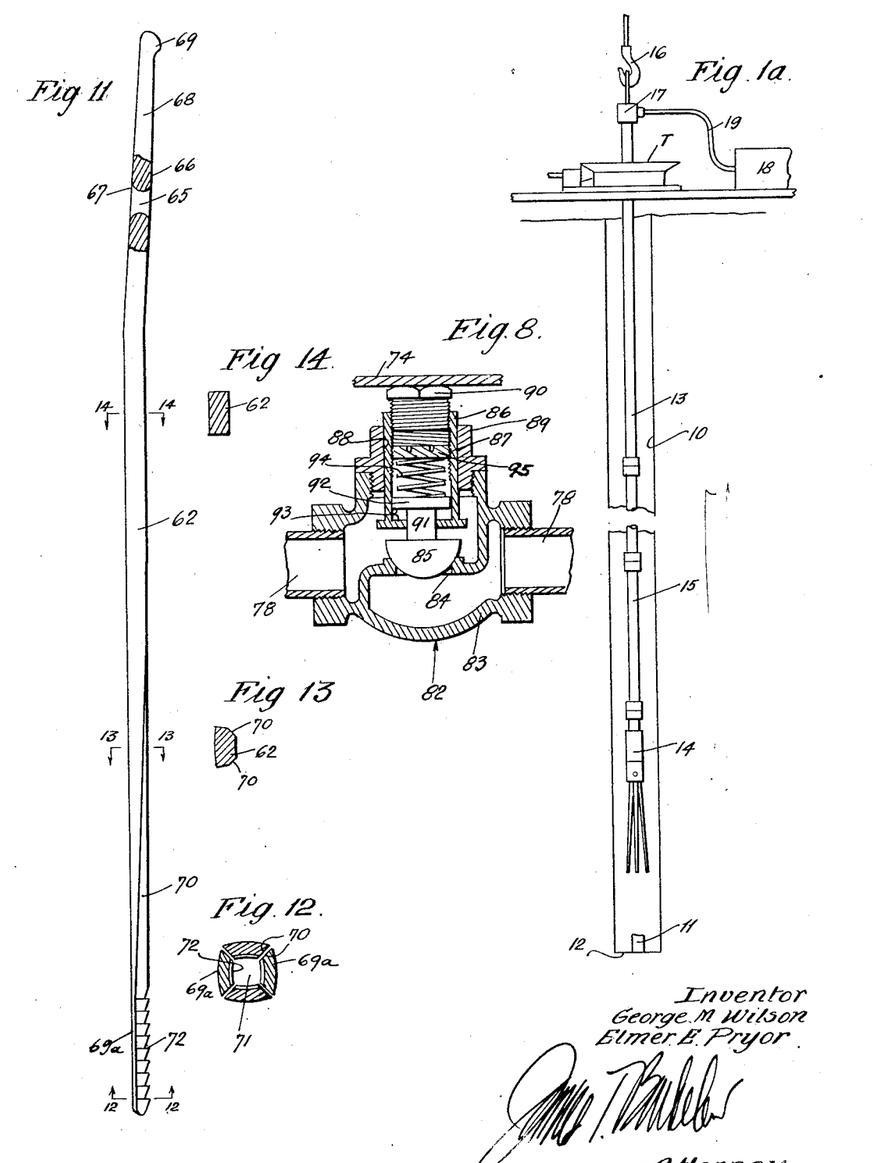

In Fig 1ᵃ a well bore is conventionally illustrated at 10, there being shown a "lost article" or fish 11 at the well bottom 12. A fishing string is indicated generally at 13, this string including the fishing tool indicated generally at 14, suspended by a usual tubular drill pipe or stem 15 which, in turn, is suspended in the usual manner from hoisting tackle 16 through the medium of circulating head 17. The sludge pump conventionally indicated at 18 has usual hose connection 19 with head 17, and is adapted to circulate flushing, mud-laden fluid through the stem 15 and tool 14 in the usual manner and for the purposes well known to those skilled in the art.

Figures 5, 6, 7, 9, 10:
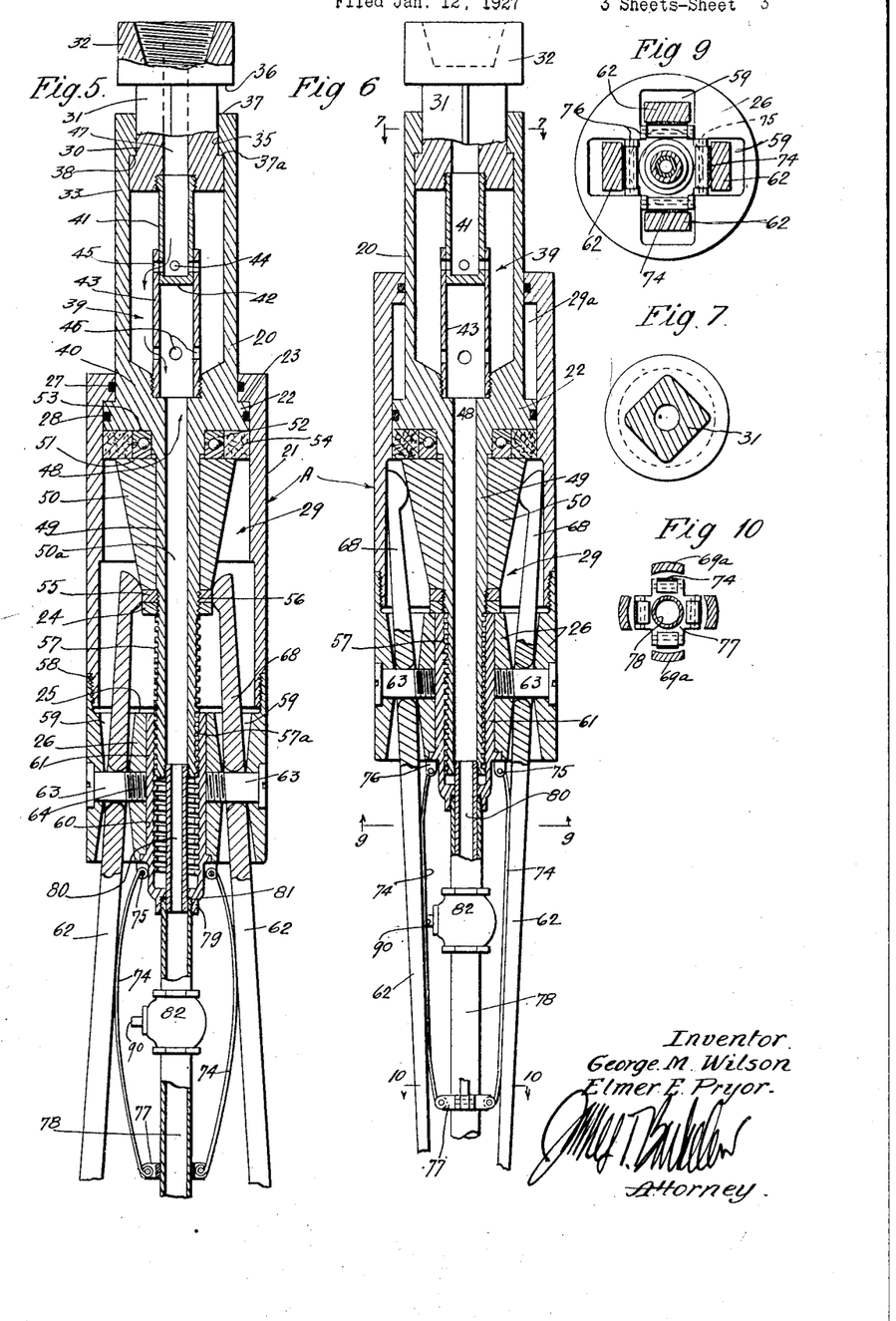
Fig. 5 is an enlarged section on line 5—5 of Fig. 1.
Fig. 6 is a view similar to Fig. 5, but showing the grapple arms in closed position.
Fig. 7 is a section on line 7—7 of Fig. 6.
Fig. 9 is a section on line 9—9 of Fig. 6.
Fig. 10 is a section on line 10—10 of Fig. 6.

Referring particularly to Figs. 5 and 6, it will be seen I have provided a central mandrel 20 and a barrel A which includes a mandrel-surrounding sleeve 21. The mandrel and sleeve are capable both of limited relative longitudinal movement and of relative rotation, the mandrel 20 having a cylindrical head 22 which engages sleeve shoulder 23 to limit the relative separative longitudinal movement of the sleeve and mandrel. The extent of relative collapsing longitudinal movement of the sleeve and mandrel is determined by the engagement of the mandrel-carried nut 24 with a shoulder 25 of sleeve 21, the nut and shoulder hereinafter being more definitely established with regard to their respective supporting members.

As will be made apparent later, the sleeve and mandrel are caused to move in a telescopic manner by virtue of threaded engagement therebetween, the sleeve having a lower nut portion 26. Packing rings 27 and 28, carried by sleeve 21 and mandrel head 22, respectively, prevent the entry of fluid to the upper part 29ᵃ (Fig. 6) of sleeve bore 29 when the tool is in the contracted or operative position of Fig. 6.

Preferably, though not necessarily, mandrel 20 has in it a slip-joint generally designated at 30, this joint being made up of shank 31 carrying usual coupling element 32, whereby connection is made with stem 15, and the upper cylinder portion 33. Shank 31 is held against rotation with respect to cylinder 33 in any suitable manner; for instance, the shank between element 32 and cylindrical head 33 may be of polygonal cross-section (Fig. 7) fitting in a complementarily formed way 35. The extent of telescopic movement between cylinder 33 and shank 31 is limited in one direction by the engagement of coupling shoulder 36 with the end 37 of the cylinder, and in the other direction by the engagement of head shoulder 37ᵃ with the annular, inner shoulder 38 on the cylinder.

For a purpose that will hereinafter be made clear, there is preferably a telescopic or slip-joint connection 39 between shank 31 and the body portion 40 of the mandrel, this joint functioning as a valve to control the passage of circulating fluid through the string and being made up of a pipe section 41, carried by and coaxial with the shank and headed at its lower end 42, and a sleeve 43, adapted to overlap or telescope with pipe 41. Sleeve 43 is threadably secured to and coaxial with the body portion 40 of the mandrel. Pipe 41 has ports 44, which, when shoulders 37ᵃ and 38 are in engagement, register with ports 45 in sleeve 43. Sleeve 43 also has ports 46 which are spaced longitudinally from ports 45. Thus, when the shank and mandrel cylinder are in the position of Fig. 5, circulating fluid from the stem bore is adapted to pass through shank bore 47, pipe 41, ports 44, 45, cylinder bore 39, ports 46, sleeve 43, and into bore 48 of the mandrel body.

Depending from and preferably integral with the body portion 40 of the mandrel is a tubular spindle 49, said spindle being coaxial with the body portion and having its bore 50ᵃ a continuation of bore 48. A downwardly pointing wedge member or spreader-cam 50 is mounted for rotation on the upper portion of spindle 49, this member preferably having the characteristics of a cone. The base 51 thereof engages the thrust bearing 52 which is shouldered against the downwardly facing end 53 of body portion 40. There preferably is also a sizable packing ring 54 entered between the cone base and shoulder 53, said packing aiding packing 28 in preventing entry of fluid to bore 29ᵃ from beneath.

Jam nuts 55 and 24 are threaded on spindle 49 at 56 to hold wedge 50 from longitudinal separative movement with respect to the spindle. Thus, while the wedge is held against longitudinal displacement with respect to the mandrel, it is capable of free rotation with respect thereto, especially in view of bearing 52.

The lower extremity of spindle 49 carries heavy threads 57, said threaded extremity being in operative engagement with the nut portion 26 of sleeve 21. This nut portion preferably, though not necessarily, may be made up in the form of a separable element, threadably connected with sleeve 21 at 58. However, hereinafter it will be considered that the sleeve and nut portion go together to make up the barrel generally designated at A.

But portion 26 may be considered as made up of a cylindrical piece having a plurality of longitudinally extending arm-ways 59 which are radially spaced from central bore 60, there being an internally threaded bushing 61 fitted tightly within bore 60 and having threaded engagement with spindle 49 at 57ª. There is a way 59 provided for each of the grapple or grab arms 62, the arms being provided in any desired number. For general purposes, four equi-spaced arms (Fig. 9) are suitable, but these arms preferably are detachably held to the barrel so one or more of them may be removed when certain fishing operations are to be carried out. A convenient and effective manner of detachably connecting the arms to the barrel is illustrated, this means comprising heavy retention screws 63 which extend from the peripheral face of the barrel across ways 59 and into threaded connection 64 with the nut portion adjacent bushing 61. Arms 62 have transverse apertures 65 to take these screws with clearance, the arms preferably being relieved about the apertures at both the inner and outer faces 66 and 67, so, said arms have, in effect, pivotal connection with the barrel. The pivotal movement thus allowed is not a movement circumferentially about the screws, for the defining walls 66 of ways 59 prevent such movement, but rather is pivotal movement of a given arm through a given axial plane of the barrel, the defining walls of the ways engaging the opposite faces of the arms adjacent screws 63 and being relieved at 68 to provide for the requisite, limited pivotal movement.

The upper extremities of arms 62, that is, portions 68 which extend above screws 63, may be considered as cam portions of said arms, for they have noses 69 adapted to engage the cone or wedge 50. Arms 62 are made of durable, wear-resisting material, and preferably have such spring or resilient characteristics as will allow their flexure under considerable load, and yet insure their return to normal position when relieved from such load. The general shape of the arms and the particular characteristics of their lower ends depend upon the particular fishing operation to be undertaken. However, we have here shown a formation which answers most general purposes, and therefore may be considered as the preferred form. Thus, in Fig. 11 arm 62 is shown as of rectangular cross-section (Fig. 14) throughout that portion immediately below aperture 65, and of arcuate cross-section (Fig. 13) from that portion to tip 69ª. The arms throughout their arcuate portion preferably are relieved as at 70, this relief gradually increasing as the tip is approached, so, at the tip, the several arms may be radially contracted to the position of Fig. 12, where it will be seen they define a relatively small work-taking aperture 71. Tips 69ª preferably have upwardly facing teeth 72 on their inner arcuate faces, and side teeth 73 on their edges.

When the tool is in the expanded condition of Fig. 5 noses 69 engage the smaller end of cone 50, being held in such engagement by springs 74, which exert a radially expansive force on said arms below screws 63. The mounting of the springs and the nature thereof are not limitative on the invention, considered in its broader aspects, for they may be varied to a considerable degree and still lie within the spirit and scope of our invention and our broader claims. However, we have here shown a particularly effective arrangement which works in well with other structural features, and therefore the showing here made may be considered as preferred. Springs 74 may be considered as bow or arcuate springs, their upper ends being secured to barrel A by attachment to pins 75 carried by spaced lugs 76 which depend from nut portion 26. The lower extremities of the springs are secured to a sliding ring or rider 77 (Fig. 10) which is mounted for movement longitudinally along stem 78, the latter depending from and being secured to the cap end 79 of bushing 61. In the present instance, though this is not necessary to the invention, considered in certain aspects, stem 78 is tubular, there being a pipe section 80 held to the end of spindle 49 and extending into the upper end of stem 78. This pipe section 80 provides a slip-joint connection between spindle 49 and stem 78 so circulating water from bore 50ª is adapted to pass through said pipe section directly to stem 78, the lower end of the latter being opened to allow the passage of the circulating fluid to the well bore. This last-named slip-joint connection prevents the entry of circulating fluid to the bore of bushing 61, which entry would have damaging effect on the bushing and spindle threads, particularly since said fluid ordinarily is mud-laden.

Packing 81 may be employed between stem 78 and cap 79 to insure a fluid-tight fit between pipe 80 and the stem.

It will be seen that while springs 74 are adapted normally to hold arms 62 in radially expanded condition, when relative rotation is set up between barrel A and mandrel 20, wedge 50 enters between cam noses 69 in a manner to spread the upper portions of the grapple arms and to swing the lower portions of the arms radially inward in a manner to contract the grapple portion of the tool against the action of springs 74, said springs then flattening out as shown in Fig. 6, while the rider 77 slides downwardly along stem 78. Due to the rotational mounting of the wedge on spindle 49, said wedge may remain stationary as regards rotation with respect to the arms, it following that the wedge is merely driven downwardly between said arms without rotating there-beneath.

As a special feature, we provide in pipe or stem 78 a "tell-tale" valve 82 (Fig. 8). We will describe this preferred type of valve in some detail, though it will be understood our invention, considered in its broader aspects, is not limited to the specified particularities. The valve body 83 is of any usual construction, having a seat 84 and a stopper 85 movable to and from said seat. Stopper 85 is carried by a telescopic, adjustable stem 86, said stem being made up of a tube portion 87 adapted to slide longitudinally through the axial bore 88 of cap 89. The effective length of stem 86 is varied by movement of head 90 longitudinally with respect to sleeve 87, the head being threaded into said sleeve for this purpose in the manner clearly shown. Preferably, connection is made between head 85 and sleeve 87 through a shank 91 which has an enlarged extremity 92 adapted to slide through the bore of the sleeve, there being an internal annular shoulder 93 on the sleeve to limit telescopic expansive movement between the sleeve and head 92. An expansive spring 94 acts between head 92 and a nut 95 threaded in the sleeve bore in a manner normally and yieldingly to hold the stopper and sleeve in full expanded condition.

In Fig. 8 the valve is shown in the condition to which it is put by forcible pressure on the upper end of head 90, a condition which is true in Fig. 6. However, when the particular arm 62 which overlies this stem is thrown by its spring 74 to a radially expanded position, there is no downward pressure on head 90, and spring 94 is therefore free to project stopper head 85 to its limit. When the valve stem is not confined to the position of Fig. 8, the downward flow of circulating water forces stopper 85 from its seat to open the valve and the fluid pressure maintains the valve in open condition until the application of external force to head 90. The length of the stem is then adjusted to be such that it will be contacted by one of the springs 74 or its overlying arm 62 in the event said arms are radially contracted to an extent less than that to which they would be contracted should the arms take hold of a fish of given over-all size, the characteristics of the fish normally being known by the operator. In other words, the grabbing elements 62 are movable to and past work-grabbing position, but if they be moved past this position, the valve stem is depressed by virtue of this movement and the valve is closed. The purpose of this arrangement may be discussed to better advantage in connection with the following description of a typical operation.

Assuming now that the character of the "fish" be known to the driller, valve 82 is set in the manner described above, and springs 74 are allowed to expand the grapple arms radially a desired distance by backing wedge 50 from between noses 69 a predetermined distance, this backing-out being accomplished by relatively rotating barrel A and mandrel 20. The tool is then lowered into the well, shank 31 and cylinder 33 being telescopically extended, and circulation being maintained through pipe 41, ports 44, 45, the bore of cylinder 33, ports 46, bore 50ª, pipe 80, pipe 78, and valve 82; the section of pipe 78 at the lower end of the valve being open to the well bore.

As the arms pass downwardly by the fish 11 and sink into bottom 12, downward movement of barrel A is checked, while the weight of the fishing string moves shank 31 downwardly with respect to cylinder 33. The consequent downward movement of pipe 41 with respect to sleeve 43 carries ports 44 out of register with ports 45, and consequently circulation is cut off and the slowing down of pump 18 advises the driller that his tool is bottomed. The driller consequently ceases lowering away and preferably, though not necessarily, immediately backs up the string sufficiently to re-register ports 45, 44, at least in part, so circulation is again established.

Figure 2:
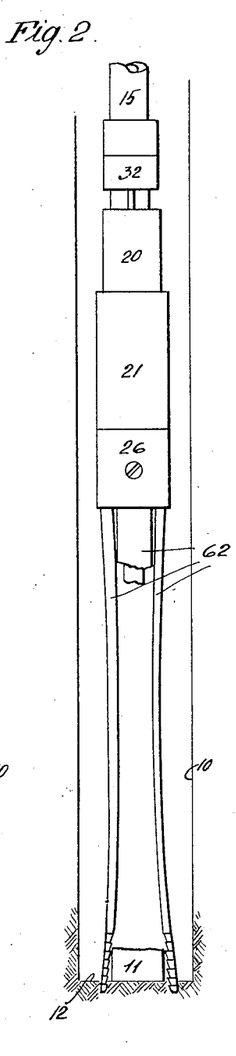
Fig. 2 is a view similar to Fig. 1, but showing the tool in engagement with the work.

The grapple arms or barrel engage the fish, the walls of the well bore or bottom 12 in such a manner that said arms and barrel A are held from subsequent rotation, and consequently, when the stem 15 is rotated by the usual rotary table T in the proper direction, mandrel 20 is rotated with respect to barrel A, and said mandrel with its wedge 50 is moved downwardly, due to the threaded engagement of spindle 49 with bushing 61. The wedge then separates the upper extents of arms 62 in a manner to swing them pivotally about screws 63 and move tips 69 into forcible engagement with the fish. During this movement, of course, stem 15 may be gradually lowered to compensate for the downward movement of the mandrel. It will be noted that due to the spacing of shoulders 36, 37, the weight of string 15 does not rest on the mandrel, and consequently the threaded connection between the mandrel and barrel is not overstrained and the tool is generally rendered most easily operable. Furthermore, in the event the "fish" must be unthreaded from an underlying part by rotatiton thereof subsequent to the "take-hold" operation, the fish and the barrel may move upwardly during the unthreading, without being resisted by the down-bearing force of stem 15. If the wedge 50 be moved downwardly after the work is engaged the spring of arms 74 allows them to bend or flex in the manner shown in Fig. 2. However, when the fish is subsequently released from the tool, the arms spring back to normal.

If the fish be properly engaged, arms 74 will not have moved inwardly a sufficient distance to depress valve stem 86, and circulation is thus maintained. However, should the arms miss the fish or slip therepast, inward movement of said arms past the predetermined work-grabbing position brings one of the springs 74 into forcible engagement with stem head 90 and moves stopper 85 to close valve 82, spring 94 yielding after the closing movement in order that the stem or valve may not fail through overstrain. This closing of the valve immediately shuts off circulation, or at least reduces it, slowing down pump 18 and thereby advising the driller that the tool has not taken hold. On the other hand, if circulation continues after the mandrel has been revolved sufficiently to engage the fish forcibly, it is an indication to the driller that the fish has been properly engaged or grabbed. In contradistinction to the usual necessity for withdrawing the tool entirely from the hole for resetting, should the circulation checking show the fish be not engaged properly, the operator merely lifts and rotates the drill stem in the opposite direction, to withdraw wedge 50 from between arms 62, said arms or barrel A still being held from rotation by engagement with the bore wall, fish or other extraneous objects within the bore to secure the necessary threaded movement. Springs 74 then are free to re-expand the tool, circulation being re-established since stopper 85 may then be lifted to open position by the fluid pressure. The tool is then once more dropped over the fish and another attempt made to grab it by moving wedge 50 downwardly.

So far as we are aware, there has never before been provided means whereby the operator is advised of the condition of his tool when within the well, and consequently it is a common occurrence to pull the tool from the well thinking the fish has been caught, only to find the operation was unsuccessful, compelling a complete "round-trip" in order to make another attempt to pick up the lost article.

Figures 3, 4:
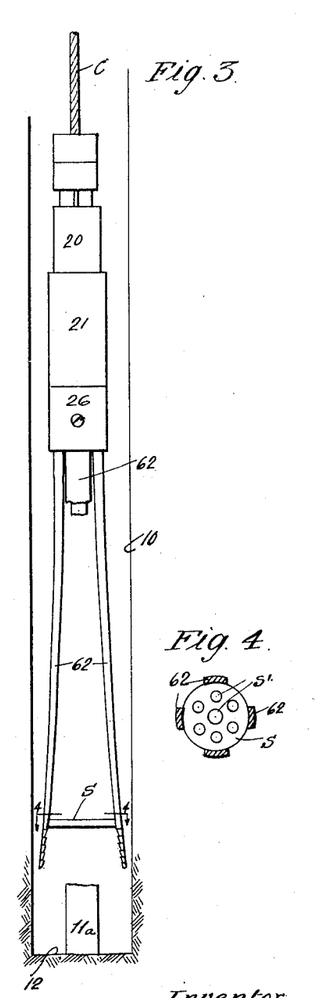
Fig. 3 shows a variational employment of the tool wherein it is in "cocked" position.
Fig. 4 is a section on line 4—4 of Fig. 3.

In Figs. 3 and 4 we have shown a use of the tool in connection with a cable drilling system where no means is available for turning the mandrel effectively once the tool is below the ground surface. In Fig. 3, cable C is substituted for stem 15, and the device is "cocked" before it is lowered into the well bore. This cocking is accomplished by placing a spreader S between arms 62 near their lower ends and while said tool is in the condition of Fig. 5. Spreader S is of a diameter to insure that the arms are spread sufficiently to embrace the given fish $11^a$. Mandrel 20 is then rotated in a manner to spread the upper ends of arm 62, this action springing the lower extents of said arm as shown in Fig. 3. Then when the tool is lowered through the well bore and the spreader is struck by fish $11^a$, said spreader is either broken, bent or canted in a manner to release the arms, which thereupon promptly spring inwardly in a manner tightly to engage the fish. Preferably, spreader S is made of relatively frangible material, and make be weakened as at S'. For instance, the spreader may be made of perforated stove plate, which is perfectly capable of holding the arm spread, but is fractured by a relatively light blow.

It will be understood the drawings and description are to be considered merely as illustrative of and not restrictive on the broader claims appended hereto, for various changes in design, structure and arrangement may be made without departing from the spirit and scope of said claims.

We claim:

1. In combination, a fishing tool adapted to be lowered from the ground surface into a well bore and embodying a grabbing element movable, when within the bore, into and past a predetermined work-grabbing position, and means adapted to give indication at the surface when the element has moved past work-grabbing position.

2. In combination, a fishing tool adapted to be lowered from the ground surface into a well bore and embodying a grapple arm movable, when within the bore, into and past a predetermined work-grabbing position, and means operable by virtue of arm-movement adapted to give indication at the surface when the element has moved past work-grabbing position.

3. In combination, a fishing tool adapted to be lowered from the ground surface into a well bore and including a movable grapple arm, a fluid pressure line from the ground surface to the tool, and a valve in the pressure line adapted to be actuated by virtue of arm-movement.

4. In combination, a fishing tool adapted to be lowered from the ground surface into a well bore and including a movable work-grabbing element, a fluid pressure line from the ground surface to the tool, and a normally open valve in the pressure line adapted to be closed by virtue of element-movement.

5. In combination, a fishing tool adapted to be lowered from the ground surface into a well bore and including a movable grapple arm, a fluid pressure line from the ground surface to the tool, and a valve in the pressure line adapted to be actuated by virtue of arm-movement, said valve being adjustable to vary the timing of its actuation under the influence of given element-movement.

6. In a device of the character described, a pair of members capable of relative rotation and of limited relative longitudinal movement, a threaded connection between the members whereby relative rotation thereof moves them relatively longitudinally, a grapple arm pivotally mounted on one of the members, a cam element on the other member, said cam being adapted to engage the arm in a manner to swing it pivotally in one direction when the members are moved relatively in given directions, and a spring adapted to swing the arm in the opposite direction when the members are moved relatively in opposite directions.

7. In a device of the character described, a pair of members capable of relative rotation and of limited relative longitudinal movement, a threaded connection between the members whereby relative rotation thereof moves them relatively longitudinally, a grapple arm pivotally mounted on one of the members, and a wedge element mounted for rotation on the other element and adapted to engage the arm in a manner to swing it pivotally in one direction when the members are moved relatively in given directions.

8. In a device of the character described, a pair of members capable of relative rotation and of limited relative longitudinal movement, a threaded connection between the members whereby relative rotation thereof moves them relatively longitudinally, a grapple arm pivotally mounted on one of the members, a cam element on the other member, said cam being adapted to engage the arm in a manner to swing it pivotally in one direction when the members are moved relatively in given directions, and a spring acting between said arm and said other member adapted to swing the arm in the opposite direction when the members are moved relatively in opposite directions.

9. In a device of the character described, a mandrel and a barrel arranged for relative movement, a pair of substantially diametrically opposed grapple arms mounted for pivotal movement on the barrel and depending below the mandrel, said arms being pivotally movable through axial planes of the barrel, a stem extending from the mandrel downwardly between the arms and adapted to limit their pivotal movement in given directions, and coacting means on the mandrel and barrel adapted to move the arms pivotally in said given directions when the mandrel and barrel are moved relatively in given directions.

10. In a device of the character described, a mandrel and a barrel arranged for relative movement, a pair of substantially diametrically opposed grapple arms mounted for pivotal movement on the barrel and depending below the mandrel, said arms being pivotally movable through axial planes of the barrel, a stem extending from the mandrel downwardly between the arms and adapted to limit their pivotal movement in given directions, coacting means on the mandrel and barrel adapted to move the arms pivotally in said given directions when the mandrel and barrel are moved relatively in given directions, and springs interposed between the stem and arms and adapted yieldingly to resist such pivotal movement.

11. In a device of the character described, a mandrel and a barrel arranged for relative movement, a pair of substantially diametrically opposed grapple arms mounted for pivotal movement on the barrel and depending below the mandrel, said arms being pivotally movable through axial planes of the barrel, a stem extending from the mandrel downwardly between the arms and adapted to limit their pivotal movement in given directions, coacting means on the mandrel and barrel adapted to move the arms pivotally in said given directions when the mandrel and barrel are moved relatively in given directions, and a rider adapted to slide longitudinally along the stem, and springs interposed between the stem and arms and adapted yieldingly to resist such pivotal movement; each spring being secured at one end to the barrel and at the other end to the rider.

12. In a device of the character described, a mandrel and a barrel arranged for relative movement and having intercommunicating bores, a grapple arm depending from the barrel to a point below the mandrel, a tubular stem depending from the mandrel alongside the arm, said arm being movable toward and away from the stem by virtue of relative movement of the barrel and mandrel, and the bore of the stem being in communication with the mandrel bore; and a normally open valve in the stem and adapted to be actuated to close the bore thereof, said valve being actuated by virtue of movement of the arm toward the stem.

13. In a device of the character described, a barrel, a nut supported by said barrel, a mandrel movable longitudinally and rotationally within the barrel bore, said mandrel having a portion threaded into said nut whereby relative rotation of the barrel and mandrel sets up relative longitudinal movement between the mandrel and barrel, a grapple arm supported by said nut for pivotal movement, and means whereby said arm is swung pivotally by virtue of said relative longitudinal movement.

14. In a device of the character described, a barrel, a nut supported by said barrel, a mandrel movable longitudinally and rotationally within the barrel bore, said mandrel having a portion threaded into said nut whereby relative rotation of the barrel and mandrel sets up relative longitudinal movement between the mandrel and barrel, a grapple arm supported by said nut for pivotal movement, said arm extending through ways extending longitudinally of the nut and beyond the opposite ends thereof, and a cam element on said mandrel, said cam being adapted by virtue of said relative longitudinal movement, to engage said arm near one end of said nut in a manner to swing it pivotally.

15. In combination, a string embodying a tubular drill stem and a tool carried by said stem, said stem being adapted to deliver circulating fluid to the tool, a slip joint in the string allowing limited relative longitudinal movement of the portions of the string at opposite sides of the joint, and a valve in the string for controlling the passage of circulating fluid through the string, said valve being operated by virtue of said relative movement.

16. In combination, a string embodying a tubular drill stem and a tool carried by said stem, said stem being adapted to deliver circulating fluid to the tool, a slip joint in the string allowing limited relative longitudinal movement of the portions of the string at opposite sides of the joint, and a valve in the string for controlling the passage of circulating fluid through the string, said valve being operated by virtue of said relative movement, said valve embodying a ported, telescopic connection between said portions.

In witness that we claim the foregoing we have hereunto subscribed our names this 27th day of December, 1926.

GEORGE M. WILSON.
ELMER E. PRYOR.

CERTIFICATE OF CORRECTION.

Patent No. 1,723,225. Granted August 6, 1929, to

GEORGE M. WILSON ET AL.

It is hereby certified that error appears in the printed specification of the above numbered patent requiring correction as follows: Page 6, lines 6 and 7, claim 5, for the compound word "element-movement" read "arm-movement"; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.